United States Patent
Murphy

(10) Patent No.: US 12,449,341 B2
(45) Date of Patent: Oct. 21, 2025

(54) OPTICAL PARTICLE CHARACTERIZATION APPARATUS

(71) Applicant: The United States of America, as represented by the Secretary of Commerce, Silver Spring, MD (US)

(72) Inventor: Daniel M. Murphy, Boulder, CO (US)

(73) Assignee: UNITED STATES OF AMERICA, AS REPRESENTED BY THE SECRETARY OF COMMERCE, Silver Spring, MD (US)

( * ) Notice: Subject to any disclaimer, the term of this patent is extended or adjusted under 35 U.S.C. 154(b) by 206 days.

(21) Appl. No.: 18/503,223

(22) Filed: Nov. 7, 2023

(65) Prior Publication Data

US 2024/0151624 A1    May 9, 2024

Related U.S. Application Data

(60) Provisional application No. 63/423,958, filed on Nov. 9, 2022.

(51) Int. Cl.
*G01N 15/02* (2024.01)
*G01N 15/0205* (2024.01)

(52) U.S. Cl.
CPC ................. *G01N 15/0211* (2013.01)

(58) Field of Classification Search
CPC ........... G01N 21/9501; G01N 15/1434; G01N 21/21; G01N 21/47; G01N 21/6458;
(Continued)

(56) References Cited

U.S. PATENT DOCUMENTS

| 5,561,515 | A | 10/1996 | Hairston et al. |
| 7,999,936 | B1 * | 8/2011 | Li ............... G01N 15/0205 356/336 |

(Continued)

FOREIGN PATENT DOCUMENTS

| JP | 2009156669 A | * | 7/2009 | |
| WO | WO-9729358 A1 | * | 8/1997 | ........... G01N 21/274 |

(Continued)

OTHER PUBLICATIONS

Szymanski, W.W. et al., "A new method for the simultaneous measurement of aerosol particle size, complex refractive index and particle density", Meas. Sci. Technol., 2003, pp. 303-307, vol. 13.

(Continued)

*Primary Examiner* — Michael P Stafira

(57) ABSTRACT

Embodiments in accordance with the present invention relate to an apparatus for optical characterization of aerosol particles, including a laser source; a beam splitter configured to split the laser into two orthogonally polarized optical beams, wherein one component of the orthogonally polarized optical beam is deflected from the second component of the polarized optical beam at a predetermined angle; a cylindrical lens for collecting the two orthogonally polarized optical beams and focusing each of the optical beams to an interrogation region; an inlet positioned to deliver the sample gas including particles to the interrogation region as a single particle gas stream through the interrogation region; an ellipsoidal mirror positioned at a non-perpendicular angle adjacent to paths traversed by the polarized optical beams to reflect scattered optical beams from the particles traversing through the interrogation region; and a photodetector for measuring the scattered optical beams reflected by the mirror.

20 Claims, 9 Drawing Sheets

(58) Field of Classification Search
CPC ........... G01N 21/8806; G01N 21/4795; G01N 15/1459; G01N 21/956; G01N 2201/06113; G01N 2015/1486; G01N 21/65; G01N 2015/1006; G01N 21/94; G01N 15/1429; G01N 15/0205; G01N 21/64; G01N 15/1433; G01N 21/359; G01N 21/49; G01N 21/35; G01N 21/88; G01N 33/49; G01N 2015/1454; G01N 15/06; G01N 2021/4792; G01N 2015/1493; G01N 21/6408; G01N 2201/0221; G01N 21/3563; G01N 21/01; G01N 21/39; G01N 15/075; G01N 21/6486; G01N 2201/062; G01N 2201/12; G01N 15/0211; G01N 2201/061; G01N 15/1484; G01N 21/636; G01N 21/8851; G01N 2201/08; G01N 33/15; G01N 21/6452; G01N 21/85; G01N 2021/3595; G01N 21/45; G01N 21/474; G01N 15/149; G01N 2021/8825; G01N 21/645; G01N 21/6428; G01N 33/02; G01N 21/211; G01N 21/6456; G01N 33/442; G01N 2021/399; G01N 15/14; G01N 1/2813; G01N 2021/8848; G01N 2201/129; G01N 33/025; G01N 21/4738; G01N 2021/4709; G01N 2015/0046; G01N 21/9508; G01N 21/55; G01N 33/54366; G01N 2021/638; G01N 21/53; G01N 21/658; G01N 2015/1027; G01N 21/1702; G01N 21/6445; G01N 21/3504; G01N 2015/144; G01N 21/51; G01N 33/4833; G01N 2015/0053; G01N 2021/8822; G01N 2021/95676; G01N 15/147; G01N 2015/012; G01N 2021/646; G01N 15/01; G01N 1/30; G01N 15/0227; G01N 15/1456; G01N 21/171; G01N 29/2418; G01N 21/76; G01N 33/543; G01N 2015/1452; G01N 21/95607; G01N 2015/0222; G01N 21/23; G01N 33/582; G01N 15/1404; G01N 2015/016; G01N 21/27; G01N 21/31; G01N 2015/1497; G01N 2015/018; G01N 2021/6439; G01N 2201/0683; G01N 21/4785; G01N 2021/655; G01N 21/25; G01N 33/56966; G01N 2021/3513; G01N 33/483; G01N 2021/6419; G01N 21/255; G01N 15/00; G01N 21/9503; G01N 2021/1793; G01N 21/00; G01N 21/4788; G01N 2201/0675; G01N 2015/1413; G01N 33/5005; G01N 2021/1787; G01N 2015/0038; G01N 2021/6421; G01N 2201/0636; G01N 2201/0691; G01N 2021/4735; G01N 2201/105; G01N 33/497; G01N 33/5094; G01N 21/6402; G01N 2201/0612; G01N 2201/12707; G01N 33/487; G01N 15/1023; G01N 2021/4778; G01N 21/276; G01N 2201/12723; G01N 21/9505; G01N 2001/2244; G01N 2001/2276; G01N 2021/0118; G01N 2021/0181; G01N 2021/479; G01N 21/1717; G01N 21/41; G01N 21/552; G01N 33/4975; G01N 33/53; G01N 33/58; G01N 35/00029; G01N 35/00871; G01N 2015/1445; G01N 2021/4707; G01N 2021/6471; G01N 2021/6482; G01N 21/95623; G01N 2015/145; G01N 2021/216; G01N 2201/06146; G01N 33/54386; G01N 2015/1488; G01N 2021/1706; G01N 21/95; G01N 29/2425; G01N 33/4915; G01N 2021/6441; G01N 2021/656; G01N 21/69; G01N 2201/0216; G01N 15/1436; G01N 21/3151; G01N 21/958; G01N 29/449; G01N 33/56972; G01N 33/80; G01N 2015/1447; G01N 21/17; G01N 21/84; G01N 27/44791; G01N 15/1425; G01N 2021/0112; G01N 2021/4714; G01N 2021/8845; G01N 2201/0633; G01N 33/5308; G01N 2015/0294; G01N 2021/6417; G01N 2201/0214; G01N 2333/00; G01N 27/44743; G01N 33/00; G01N 33/5008; G01N 2015/1029; G01N 21/648; G01N 33/54313; G01N 21/8422; G01N 27/44721; G01N 11/00; G01N 2015/03; G01N 2015/1495; G01N 2021/4711; G01N 2021/6463; G01N 2021/8887; G01N 21/59; G01N 2201/067; G01N 33/6854; G01N 35/028; G01N 15/1427; G01N 2021/1727; G01N 2021/1789; G01N 2021/217; G01N 2021/651; G01N 21/274; G01N 21/3581; G01N 21/6489; G01N 2201/063; G01N 2201/0638; G01N 2201/103; G01N 33/536; G01N 33/542; G01N 2015/0238; G01N 2015/1021; G01N 2021/458; G01N 2021/4742; G01N 2021/555; G01N 2021/653; G01N 2021/8835; G01N 2021/9548; G01N 2035/00326; G01N 21/954; G01N 2201/0627; G01N 2201/064; G01N 2201/068; G01N 23/223; G01N 33/50; G01N 15/1431; G01N 2011/008; G01N 2013/006; G01N 2015/0003; G01N 2015/025; G01N 2021/1708; G01N 2021/556; G01N 2021/8854; G01N 2021/9513; G01N 21/453; G01N 2201/0846; G01N 2223/611; G01N 23/2251; G01N 25/04; G01N 2500/00; G01N 2500/10; G01N 33/5302; G01N 33/6845; G01N 35/08; G01N 5/045; G01N 15/10; G01N 2015/0011; G01N 2015/0687; G01N 2021/8592; G01N 23/20; G01N 27/44704; G01N 27/4473; G01N 33/54326; G01N 37/005; G01N 15/1409; G01N 2015/014; G01N 2015/1438; G01N 2021/1765; G01N 2021/1772; G01N 2021/6484; G01N 2021/8896; G01N 21/0303; G01N 21/19; G01N 21/532; G01N 21/718; G01N 21/763; G01N 22/00; G01N 2201/0438; G01N 2203/0089; G01N 2800/22; G01N 33/492; G01N 33/5304; G01N 33/57407; G01N 33/6893; G01N 33/92; G01N 15/042; G01N 15/1468; G01N 2015/0092; G01N 2015/0216; G01N 2021/1725; G01N 2021/1736; G01N 2021/1785; G01N 2021/1795; G01N 2021/8809; G01N 2021/8918; G01N 21/253; G01N 21/314; G01N 21/3586;

G01N 21/57; G01N 21/8901; G01N 2201/10; G01N 33/52; G01N 2015/1415; G01N 2021/1712; G01N 2021/213; G01N 2021/513; G01N 2021/6423; G01N 2021/6432; G01N 2021/8405; G01N 2021/8427; G01N 2021/8681; G01N 2021/8864; G01N 2201/0668; G01N 2201/0697; G01N 2201/1296; G01N 2800/7028; G01N 33/46; G01N 2015/0233; G01N 2015/103; G01N 2021/218; G01N 2021/4783; G01N 21/33; G01N 21/43; G01N 21/66; G01N 21/8914; G01N 2201/1045; G01N 2203/0094; G01N 23/225; G01N 2800/32; G01N 2800/50; G01N 33/6887; G01N 2021/177; G01N 2021/4166; G01N 2021/516; G01N 2021/6478; G01N 2021/7786; G01N 2021/845; G01N 2035/00881; G01N 21/3577; G01N 21/4133; G01N 21/8803; G01N 21/95684; G01N 2201/06193; G01N 2201/0626; G01N 2201/0637; G01N 2201/121; G01N 2291/02475; G01N 2333/445; G01N 27/447; G01N 29/0681; G01N 33/5011; G01N 33/54373; G01N 35/00; G01N 1/34; G01N 11/165; G01N 15/04; G01N 2001/007; G01N 2015/0026; G01N 2015/1402; G01N 2021/1738; G01N 2021/4704; G01N 2021/8438; G01N 2021/8557; G01N 2021/8816; G01N 2021/8867; G01N 2021/9511; G01N 21/05; G01N 21/3103; G01N 21/3554; G01N 21/553; G01N 21/554; G01N 21/71; G01N 21/86; G01N 21/93; G01N 2201/104; G01N 2201/126; G01N 29/043; G01N 33/20; G01N 33/202; G01N 33/24; G01N 33/4905; G01N 33/54346; G01N 33/721; G01N 35/00069; G01N 1/312; G01N 2015/0288; G01N 2015/035; G01N 2021/1757; G01N 2021/1776; G01N 2021/178; G01N 2021/3133; G01N 2021/3155; G01N 2021/3174; G01N 2021/3181; G01N 2021/4153; G01N 2021/559; G01N 2021/8874; G01N 2021/8893; G01N 2021/8967; G01N 2035/00138; G01N 2035/00356; G01N 2035/00455; G01N 2035/00801; G01N 2035/0401; G01N 2035/0412; G01N 2035/0493; G01N 2035/0498; G01N 2035/103; G01N 21/13; G01N 21/74; G01N 21/78; G01N 21/82; G01N 21/8507; G01N 21/8903; G01N 2201/06; G01N 2201/0662; G01N 2201/0686; G01N 2201/0694; G01N 2201/0696; G01N 2201/1241; G01N 2291/0234; G01N 2291/02466; G01N 2291/02827; G01N 2291/0289; G01N 25/16; G01N 30/00; G01N 30/02; G01N 33/0022; G01N 33/004; G01N 33/48721; G01N 35/00732; G01N 35/0099; G01N 35/021; G01N 35/04; G01N 35/1065; G01N 35/109; G01N 11/16; G01N 2001/2223; G01N 2015/0096; G01N 2015/1028; G01N 2021/058; G01N 2021/151; G01N 2021/1704; G01N 2021/1714; G01N 2021/1734; G01N 2021/1782; G01N 2021/215; G01N 2021/392; G01N 2021/4761; G01N 2021/4797; G01N 2021/6476; G01N 2021/8472; G01N 2021/8861; G01N 2021/887; G01N 21/63; G01N 21/72; G01N 21/87; G01N 21/9054; G01N 21/95692; G01N 2201/024; G01N 2201/0618; G01N 2201/065; G01N 2201/127; G01N 2291/02881; G01N 2291/0426; G01N 2291/0427; G01N 2333/71; G01N 29/4436; G01N 29/46; G01N 33/389; G01N 33/491; G01N 33/493; G01N 33/5026; G01N 33/5044; G01N 33/5091; G01N 33/551; G01N 33/57415; G01N 33/588; G01N 33/68; G01N 33/689; G01N 37/00; G01N 1/2202; G01N 1/36; G01N 1/4055; G01N 15/0255; G01N 15/1031; G01N 15/1492; G01N 19/08; G01N 2001/4061; G01N 2015/1443; G01N 2015/1472; G01N 2015/1479; G01N 2015/1481; G01N 2021/015; G01N 2021/0346; G01N 2021/052; G01N 2021/174; G01N 2021/1761; G01N 2021/3166; G01N 2021/391; G01N 2021/396; G01N 2021/398; G01N 2021/4173; G01N 2021/4747; G01N 2021/4759; G01N 2021/4773; G01N 2021/6469; G01N 2021/6491; G01N 2021/8812; G01N 2021/8829; G01N 2021/8883; G01N 2021/9542; G01N 21/031; G01N 21/251; G01N 21/272; G01N 21/538; G01N 21/643; G01N 21/7703; G01N 21/894; G01N 21/90; G01N 21/9036; G01N 21/952; G01N 2201/0245; G01N 2201/0634; G01N 2201/0806; G01N 2201/0833; G01N 2201/088; G01N 2201/1042; G01N 2201/1211; G01N 2201/1218; G01N 2201/125; G01N 23/00; G01N 24/088; G01N 2458/00; G01N 27/4141; G01N 27/44769; G01N 29/02; G01N 29/0654; G01N 29/262; G01N 29/4427; G01N 33/0027; G01N 33/18; G01N 33/1826; G01N 33/2823; G01N 33/5023; G01N 33/5306; G01N 33/553; G01N 33/57473; G01N 5/04; G01N 1/06; G01N 1/22; G01N 1/2205; G01N 1/2273; G01N 1/4077; G01N 13/02; G01N 15/02; G01N 15/0266; G01N 15/0612; G01N 15/0656; G01N 2001/002; G01N 2001/4088; G01N 2011/002; G01N 2013/0283; G01N 2015/0049; G01N 2015/019; G01N 2015/0277; G01N 2021/1731; G01N 2021/1748; G01N 2021/214; G01N 2021/451; G01N 2021/4721; G01N 2021/4733; G01N 2021/4769; G01N 2021/4776; G01N 2021/558; G01N 2021/635; G01N 2021/6467; G01N 2021/7779; G01N 2021/8433; G01N 2021/8444; G01N 2021/8466; G01N 2021/8902; G01N 2021/945; G01N 2021/9518; G01N 2021/9546; G01N 21/0332; G01N 21/15; G01N 21/278;

G01N 21/412; G01N 21/61; G01N 21/8483; G01N 21/9072; G01N 21/9506; G01N 21/9515; G01N 2201/02; G01N 2201/0238; G01N 2201/0628; G01N 2201/0635; G01N 2201/0642; G01N 2201/069; G01N 2201/0826; G01N 2201/084; G01N 2201/102; G01N 2201/1214; G01N 2201/124; G01N 2201/12715; G01N 2291/0237; G01N 2291/105; G01N 2291/106; G01N 25/145; G01N 25/147; G01N 27/44752; G01N 27/453; G01N 29/0672; G01N 29/11; G01N 29/48; G01N 33/0006; G01N 33/241; G01N 33/533; G01N 33/5438; G01N 33/57492; G01N 33/585; G01N 33/587

See application file for complete search history.

(56) References Cited

U.S. PATENT DOCUMENTS

| | | | | |
|---|---|---|---|---|
| 2007/0268489 A1* | 11/2007 | Schwabe | ............ | G01N 21/6428 356/337 |
| 2008/0106736 A1* | 5/2008 | Graves | ................ | G01N 15/147 356/73 |
| 2009/0039249 A1* | 2/2009 | Wang | ................ | G01N 15/1459 250/282 |
| 2012/0105849 A1 | 5/2012 | Sivaprakasam | | |
| 2013/0242301 A1* | 9/2013 | Berg | ................ | G01N 15/1434 356/336 |
| 2016/0202164 A1* | 7/2016 | Trainer | .............. | G01N 15/0211 356/336 |

FOREIGN PATENT DOCUMENTS

| | | | | |
|---|---|---|---|---|
| WO | WO-2010099118 A1 * | 9/2010 | ......... | G01N 15/1436 |
| WO | WO-2019082186 A1 * | 5/2019 | ......... | G01N 15/1459 |
| WO | WO-2020259889 A1 * | 12/2020 | ......... | G01N 15/1434 |

OTHER PUBLICATIONS

Sivaprakasam, V. et al., "A Novel Polarized Elastic Scatter Detection Method of Aerosol Particle Velocimetry with Reduced Errors Due to Coincidence and Phantom Particles", Aerosol Science and Technology, 2013, pp. 249-257, vol. 47.

Schmidt, B.E. et al., "Analysis of Focused Laser Differential Interferometry", Applied Optics, 2015, pp. 8459-8472, vol. 54, No. 28.

* cited by examiner

OPTICAL PARTICLE CHARACTERIZATION APPARATUS

CROSS-REFERENCE TO RELATED APPLICATION

This application claims the benefit of priority from U.S. Provisional Patent Application Ser. No. 63/423,958, filed on Nov. 9, 2022, the disclosure of which is incorporated herein by reference in its entirety.

STATEMENT REGARDING FEDERAL RIGHTS

The invention described herein was made with support from the National Oceanic and Atmospheric Administration (NOAA) of the United States Department of Commerce. The United States Government has certain rights in the invention.

FIELD OF THE INVENTION

The present disclosure relates generally to particle characterization, and more particularly, to an optical particle characterization apparatus.

BACKGROUND OF THE INVENTION

Optical particle counters are available for measuring scattered light as particles pass through a light beam. They can count particles and measure an optical diameter that has some dependence on refractive index. For atmospheric applications such as comparisons to global climate models and tracking conserved mass, there is a need to determine geometric diameter and density, not just a diameter defined by scattered light. One method to measure density includes combining information from light scattering with the velocity of a particle after it passes through a converging nozzle or a sonic nozzle. Lightweight particles are accelerated nearly to the gas velocity, but heavier particles have more inertia and do not travel as fast.

Previous apparatus designs for measuring the velocity of particles through a light beam have complex optics, have limited size range, and have limited accuracy for measuring scattered light. Other apparatus designs for aerosol particles characterization combine optical information using two lasers and four detectors for scattered light. However, these designs do not provide polarization information. Complex optical designs are difficult to construct, and the use of multiple lasers and detectors inherently adds noise to the measurements and precludes use of the transmitted light for interferometry. Accordingly, there is need for a particle characterization apparatus having a design using fewer optical elements but capable of measuring geometric diameter and density of aerosol particles.

SUMMARY OF THE INVENTION

Embodiments in accordance with the present invention relate to an apparatus for optical characterization of particles in a gas sample, which combines optical elements and aerodynamic particle sizer in a geometry using ellipsoidal beam focal points suitable for measuring light scattered by particles. An optical particle characterization apparatus in accordance with embodiments of the present invention uses split polarization in a combined optical and aerodynamic particle sizer to determine particle shape. A laser beam from a laser source is split into two beams having different polarizations with a polarizing beam splitter, and a cylindrical lens is used to propagate the split beams in parallel and focus the beam to ellipsoidal focal point. Gas flows through an inlet bringing particles through the laser beam focus. As a particle goes through the split beams, detectors record two peaks of scattered light. The velocity of the particle can be determined from the time separation between the peaks and the optical diameter of the particle can be determined from the peak heights. Sphericity of the particle can be determined by comparing the peak heights from the two beams having different polarizations. Non-spherical particles will tend to have dissimilar peak heights from the two polarizations. Transmitted detectors can be used to measure the light absorbed by the particle. In some embodiments of the present invention, a less ambiguous size response and, for some particle sizes, refractive index of the particles can be obtained by rotating the position of the ellipsoidal (or other) mirrors. Embodiments in accordance with the present invention also use the transmitted light for a measure of light absorption by the particles.

Embodiments in accordance with the present invention relate to an apparatus for measuring particles in a sample gas, including a light source for emitting a first optical beam; a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle; a first lens configured to collect the first component and the second component polarized optical beams and focus each of the first component and the second component polarized optical beams to an interrogation region, wherein the first optical beam splitter is positioned at the first lens focal point; an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream flowing through the interrogation region scatters the first component and the second component polarized optical beams; a first mirror positioned adjacent to paths traversed by the first component and the second component polarized optical beams to reflect a first scattered optical beam scattered from the first component polarized optical beam and a second scattered optical beam scattered from the second component polarized optical beam, wherein an axis perpendicular to a plane of the first mirror intersects the paths traversed by the first component and the second component polarized optical beams at a non-perpendicular second angle, wherein the first mirror focal point is positioned at the interrogation region; a first photodetector positioned to measure the first and the second scattered optical beams from the first mirror and produce corresponding first and second signals; and a processor, responsive to the first and the second signals from the first photodetector, for calculating intensity and time separation of the first and the second scattered optical beams, wherein the processor, responsive to said intensity and time separation of the first and the second scattered optical beams, determines velocity and aerodynamic diameter of the particles in the sample gas. More particularly, the first optical beam splitter is Wollaston prism and the light source is a 450 nm diode laser.

The apparatus in accordance with an embodiment of the present invention further includes a second lens configured to collect the first component and the second component polarized optical beams transmitted through the interrogation region and focus each of the collected the first component and the second component polarized optical beams to the second lens focal point; and a second photodetector positioned at the second lens focal point to measure the each of the collected the first component and the second component polarized optical beams and produce corresponding third and fourth signals, wherein the processor, responsive to the third and the fourth signals from the second photodetector, determines extinction of the particles in the sample gas.

The apparatus in accordance with an embodiment of the present invention further includes a second mirror positioned facing the first mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second mirror aligns with the axis perpendicular to the plane of the first mirror, wherein the second mirror focal point is positioned at the interrogation region; and a second photodetector positioned to measure the third and the fourth scattered optical beams from the second mirror and produce corresponding third and fourth signals, wherein the processor, responsive to the third and the fourth signals from the second photodetector, calculates intensity and time separation of the third and the fourth scattered optical beams, wherein the processor, responsive to said intensity and time separation of the third and the fourth scattered optical beams, determines velocity and aerodynamic diameter of the particles in the sample gas.

In one embodiment, the apparatus in accordance with an embodiment of the present invention further includes a second lens configured to collect the first component and the second component polarized optical beams transmitted through the interrogation region and focus each of the collected the first component and the second component polarized optical beams to the second lens focal point; a second optical beam splitter positioned at the second lens focal point and configured to split the focused the first and the second polarized optical beams into a third component polarized optical beam and a fourth component polarized optical beam, wherein the splitting the focused the first component and the second component polarized optical beams into the third component and the fourth component polarized optical beams comprises deflecting the third component polarized optical beam from the fourth component polarized optical beam at a third angle; a third photodetector positioned to measure the third component polarized optical beam and produce a corresponding fifth signal; and a fourth photodetector positioned to measure the fourth component polarized optical beam and produce a corresponding sixth signal, wherein the processor, responsive to the fifth and the sixth signals, determines extinction of the particles in the sample gas. In one embodiment, each of the first and the second lenses is a 40 mm cylindrical lens. In another embodiment, each of the first and the second mirrors is an ellipsoidal mirror.

In some embodiments of the present invention, the axis perpendicular to the plane of the first and the second mirrors intersects the paths traversed by the first component and the second component polarized optical beams at the second angle of about 75 degrees.

The present invention also relate to an apparatus for measuring particles in a sample gas, including a light source for emitting a first optical beam; a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle; a first cylindrical lens configured to collect the first component and the second component polarized optical beams and focus each of the first component and the second component polarized optical beams to an interrogation region, wherein the first optical beam splitter is positioned at the first cylindrical lens focal point; an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream flowing through the interrogation region scatters the first component and the second component polarized optical beams; a first mirror positioned adjacent to paths traversed by the first component and the second component polarized optical beams to reflect a first scattered optical beam scattered from the first component polarized optical beam and a second scattered optical beam scattered from the second component polarized optical beam, wherein an axis perpendicular to a plane of the first mirror intersects the paths traversed by the first component and the second component polarized optical beams at a non-perpendicular second angle, wherein the first mirror focal point is positioned at the interrogation region; a first photodetector positioned to measure the first and the second scattered optical beams from the first mirror and produce corresponding first and second signals; a second mirror positioned facing the first mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second mirror aligns with the axis perpendicular to the plane of the first mirror, wherein the second mirror focal point is positioned at the interrogation region; and a second photodetector positioned to measure the third and the fourth scattered optical beams from the second mirror and produce corresponding third and fourth signals; a processor, responsive to the first, the second, the third and the fourth signals, for calculating intensity and time separation of the first, the second, the third and the fourth scattered optical beams, wherein the processor, responsive to said intensity and time separation, determines velocity and aerodynamic diameter of the particles in the sample gas.

In some embodiments of the present invention, the apparatus further includes a second cylindrical lens configured to collect the first component and the second component polarized optical beams transmitted through the interrogation region and focus each of the collected the first component and the second component polarized optical beams to the second cylindrical lens focal point; a third photodetector positioned at the second cylindrical lens focal point to measure the each of the collected the first component and the second component polarized optical beams and produce corresponding fifth and sixth signals, wherein the processor, responsive to the fifth and sixth signals from the third photodetector, determines extinction of the particles in said sample gas.

Another embodiments of the present invention relate to an apparatus for measuring particles in a sample gas, including a light source for emitting a first optical beam; a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle; a first cylindrical lens configured to collect the first component and the second component polarized optical beams and focus each of the first component and the second component polarized optical beams to an interrogation region, wherein the first optical beam splitter is positioned at the first cylindrical lens focal point; an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream through the interrogation region scatters the first component and the second component polarized optical beams; a first ellipsoidal mirror positioned adjacent to paths traversed by the first component and the second component polarized optical beams to reflect a first scattered optical beam scattered from the first component polarized optical beam and a second scattered optical beam from the second component polarized optical beam, wherein an axis perpendicular to a plane of the first ellipsoidal mirror intersects the paths traversed by the first component and the second component polarized optical beams at a non-perpendicular second angle, wherein the first ellipsoidal mirror focal point is positioned at the interrogation region; a first photodetector positioned to measure the first and the second scattered optical beams from the first ellipsoidal mirror and produce corresponding first and second signals; a second ellipsoidal mirror positioned facing the first ellipsoidal mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second ellipsoidal mirror aligns with the axis perpendicular to the plane of the first ellipsoidal mirror, wherein the second ellipsoidal mirror focal point is positioned at the interrogation region; a second photodetector positioned to measure the third and the fourth scattered optical beams from the second ellipsoidal mirror and produce corresponding third and fourth signals; a second cylindrical lens configured to collect the first component and the second component polarized optical beams transmitted through the interrogation region and focus each of the collected the first component and the second component polarized optical beams to the second cylindrical lens focal point; a second optical beam splitter positioned at the second cylindrical lens focal point and configured to split the focused the first and the second polarized optical beams into a third component polarized optical beam and a fourth component polarized optical beam, wherein the splitting the focused the first component and the second component polarized optical beams into the third component and the fourth component polarized optical beams comprises deflecting the third component polarized optical beam from the fourth component polarized optical beam at a third angle; a third photodetector positioned to measure the third component polarized optical beam and produce a corresponding third signal; a fourth photodetector positioned to measure the fourth component polarized optical beam and produce a corresponding fourth signal; and a processor, responsive to the first signal from the first photodetector and the second signal from the second photodetector, determines velocity and aerodynamic diameter of the particles in said sample gas, wherein the processor, responsive to the third and fourth signals from the third and the fourth photodetectors, determines extinction of the particles in said sample gas.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
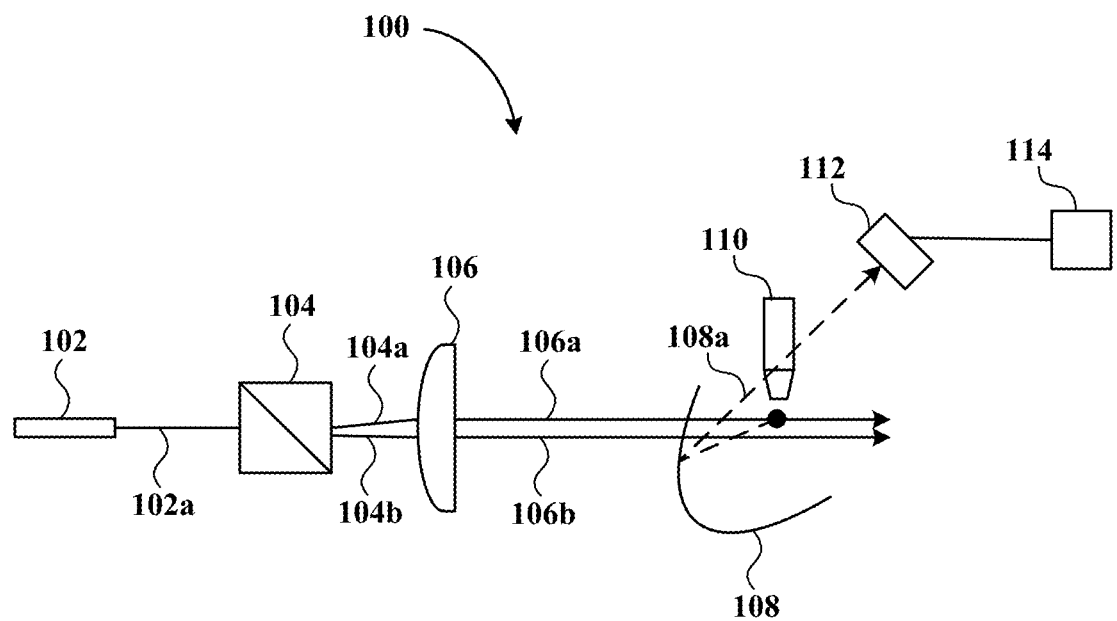
FIG. 1 illustrates an optical particle characterization apparatus in accordance with an embodiment of the present invention.

Referring now to the drawings, and more particularly, to FIG. 1, there is shown an optical particle characterization apparatus for measuring particles in a sample gas, generally designated 100, which comprises embodiments of the present invention. Optical particle characterization apparatus 100 includes a light source 102, a polarizing beam splitter 104, a first lens 106, a first mirror 108, a sample inlet 110, a first photodetector 112, and a processor 114.

Light source 102 is configured to generate an optical beam 102a for delivery to a gas sample including particles. Light source 102 may be embodied as a laser or laser array, such as a diode laser, diode laser array, diode laser pumped solid state laser, LED, LED array, gas phase laser, solid state laser, and the like. In one embodiment, optical beam 102a passes through a linear polarizing element to generate a linearly polarized optical beam at 45 degrees to an axis of beam splitter 104. In another embodiment, the optical beam 102a is unpolarized. Light source 102 suitably generates light comprising a wavelength corresponding to an optical region of interest in a sample. For gases containing particles, wavelength of light generated by light source 102 corresponds to optical region where information on light extinction can be obtained. In one embodiment of the present invention, light source 102 is a collimated 1.2 mm diameter 450 nm diode laser. In another embodiment, light source 102 is a 532 nm doubled YAG laser. In yet another embodiment of the present invention, light source 102 is a visible wavelength light emitting diode. In some embodiments of the present invention, a combination of spherical lenses is positioned to focus optical beam 102a from light source 102.

Beam splitter 104 is positioned to receive optical beam 102a from light source 102 and split incident optical beam 102a into two orthogonally polarized optical beams 104a and 104b such that orthogonally polarized optical beam 104a is deflected from orthogonally polarized optical beam 104b at a predetermined angle and orthogonally polarized optical beam 104a is separated from orthogonally polarized optical beam 104b by a predetermined distance. In one embodiment of the present invention, optical beam 104a is s-polarized and optical beam 104b is p-polarized. Exemplary polarizing beam splitters that can be used in embodiments of the present invention include Wollaston prism, a Rochon prism, Senarmont prism, Sanderson prism, and the like. In a preferred embodiment of the present invention, polarizing beam splitter 104 is a Wollaston prism capable of splitting optical beam 102a into orthogonally polarized optical beams 104a and 104b. In an exemplary embodiment of the present invention, polarizing beam splitter 104 is a Wollaston prism capable of splitting optical beam 102a into orthogonally polarized optical beams 104a and 104b deflected at an angle of about 1.33 degrees.

Lens 106 is positioned to collect orthogonally polarized optical beams 104a and 104b from beam splitter 104, and focus the collected orthogonally polarized beams 104a and 104b to an interrogation region, located at the primary focus of mirror 108, as collimated optical beams 106a and 106b. Lens 106 is aligned such that the angled split of optical beam 102a into optical beams 104a and 104b at beam splitter 104 occurs at the focal point of lens 106. In one embodiment of the present invention, lens 106 focuses the collected orthogonally polarized beams 104a and 104b to an interrogation region as sheet-like optical beams with 90 degrees polarizations. Lens 106 preserves a distance between optical beams 106a and 106b at a predetermined distance regardless of small displacements of the laser and lens elements due to mechanical vibration or temperature fluctuations. Exemplary lens that can be used in embodiments of the present invention include cylindrical lens, spherical lens, and the like. In one embodiment of the present invention, lens 106 is a cylindrical lens. In an exemplary embodiment of the present invention, lens 106 is a 40 mm cylindrical lens capable of collimating each of optical beams 106a and 106b to about a 1.4 nm diameter beam that are separated by about 1 mm and each having a focal size of about 17 μm and a Rayleigh range of about 475 μm.

Figure 2:
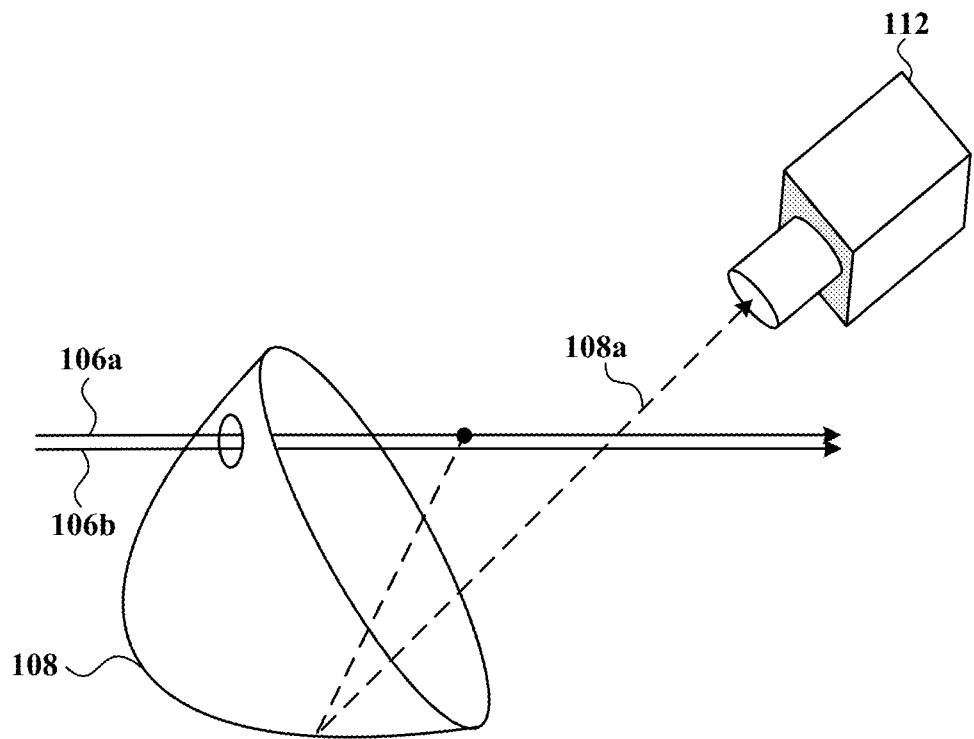
FIG. 2 illustrates an alternate view of light collection optics in an optical particle characterization apparatus in accordance with an embodiment of the present invention.

Mirror 108 is positioned adjacent to paths traversed by optical beams 106a and 106b such that an axis perpendicular to the face of mirror 108 intersects the beam paths of optical beams 106a and 106b at a predetermined angle, and further positioned such that mirror 108 focal point coincides with the interrogation region, as shown in FIG. 1 and FIG. 2. In one embodiment of the present invention, mirror 108 is an ellipsoidal mirror. In another embodiment of the present invention, mirror 108 is a hemispherical mirror. In an exemplary embodiment of the present invention, mirror 108 is an ellipsoidal mirror having an eccentricity of from about 0.33 to about 0.5. Inlet 110 is positioned adjacent to mirror 108 focal point to introduce a gas sample including particles in the interrogation region such that the particles are directed through optical beams 106a and 106b in the interrogation region, as further shown in FIG. 1. Inlet 110 includes a channel configured to restrict the flow of the gas sample to a single particle gas stream such that only a single particle traverses through the interrogation region and mirror 108 focal point at a time during interrogation of the gas sample. In some embodiments of the present invention, inlet 110 is configured such that the velocity of each particle exiting inlet 110 is dependent on that particle's size, shape, and mass. In other embodiments of the present invention, inlet 110 is configured to concentrate particles near the center of optical beams 106a and 106b transmitting through the interrogation region.

Mirror 108 is aligned to reflect optical beam 108a scattered by a particle in the interrogation region positioned at mirror 108 focal point. Mirror 108 can be rotated to predetermined angles between an axis traversing through mirror 108 and beam paths of optical beams 106a and 106b such that ambiguous particle sizes are not observed for particles having diameters of about two times the wavelength of light emitted by light source 102. In embodiments of the present invention wherein light source 102 emits a 450 nm light or a 532 nm light, mirror 108 can be rotated to predetermined angles between an axis traversing through mirror 108 and beam paths of optical beams 106a and 106b such that ambiguous particle sizes are not observed for particles having diameters of about 1 μm. In one embodiment of the present invention, the angle between an axis traversing perpendicular to mirror 108 and beam paths of optical beams 106a and 106b is about 75 degrees. Ambiguous particle sizes are observed for particles having diameters near 1 μm when the angle between axis traversing through mirror 108 and beam paths of optical beams 106a and 106b is about 90 degrees.

Figure 3:
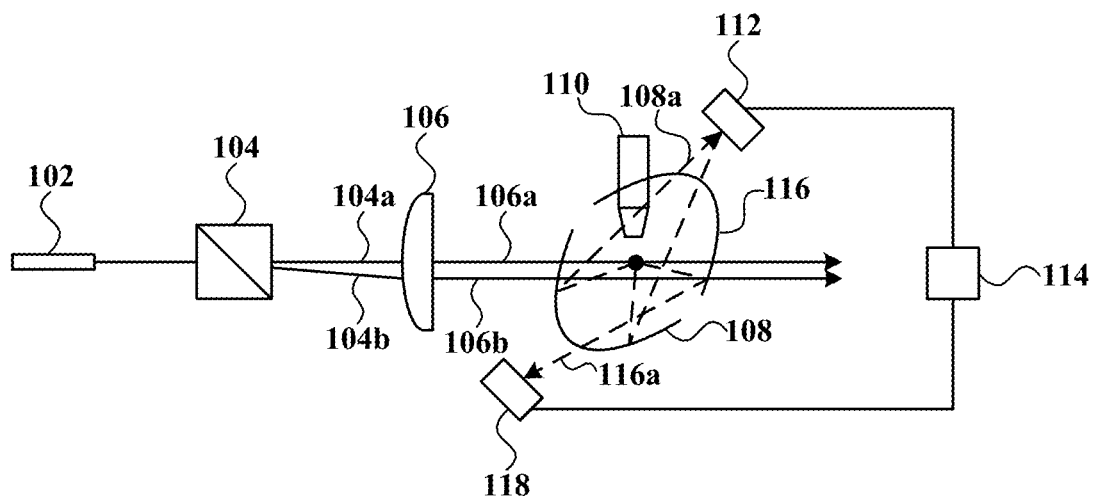
FIG. 3 illustrates an optical particle characterization apparatus in accordance with an alternate embodiment of the present invention.
Figure 4:
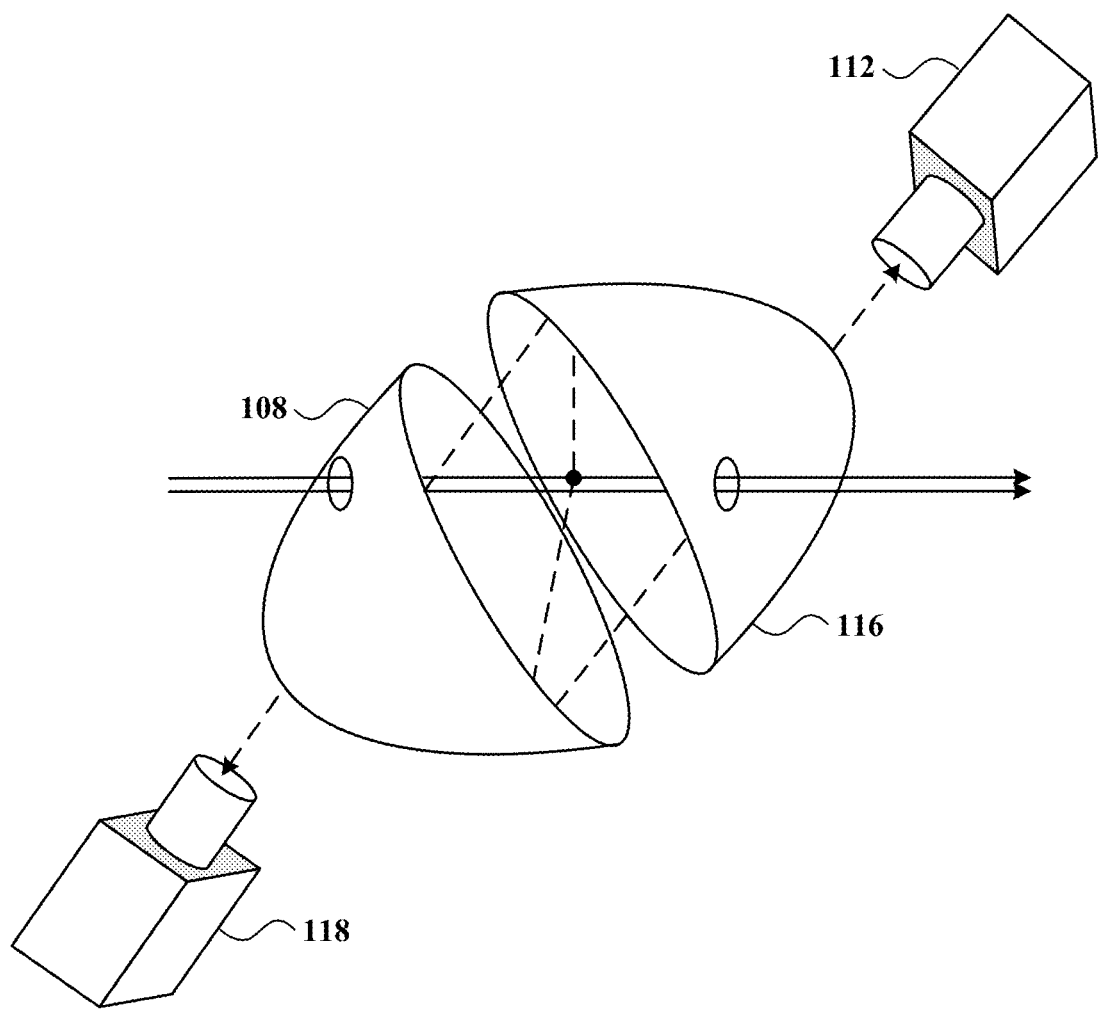
FIG. 4 illustrates an alternate arrangement of light collection optics in an optical particle characterization apparatus in accordance with an embodiment of the present invention.
Figure 7:
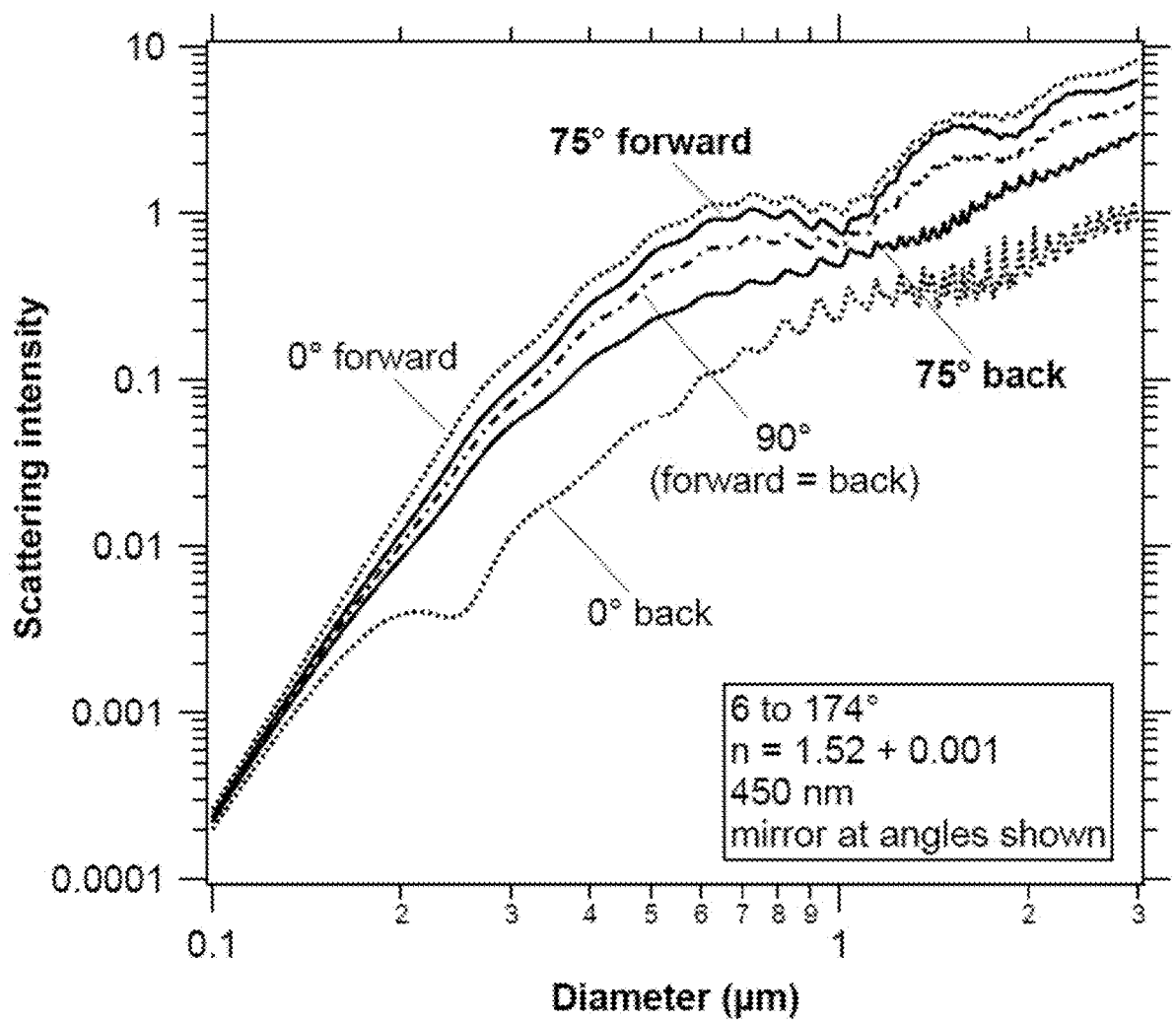
FIG. 7 illustrates a plot comparing signals obtained using an optical particle characterization apparatus in accordance with an embodiment of the present invention.

In some embodiments of the present invention, a second mirror 116 may be positioned facing mirror 108 and adjacent to paths traversed by optical beams 106a and 106b such that an axis perpendicular to the face of mirror 116 aligns with an axis perpendicular to the face of mirror 108 and intersects the beam paths of optical beams 106a and 106b at a predetermined angle, as shown in FIG. 3 and FIG. 4. In one embodiment of the present invention, mirror 116 is an ellipsoidal mirror. In another embodiment of the present invention, mirror 116 is a hemispherical mirror. Mirrors 108 and 116 can be rotated to predetermined angles between axes traversing through mirrors 108 and 116 and beam paths of optical beams 106a and 106b such that mirror 108 collects the backward scatter of optical beams 106a and 106b and mirror 116 collects the forward scatter of optical beams 106a and 106b, and such that ambiguous particle sizes are not observed for particles having diameters of about two times the wavelength of light emitted by light source 102. A partial separation of forward scatter light and backward scatter light from particles can be obtained when the axis traversing through mirrors 108 and 116 is not perpendicular to beam paths of optical beams 106a and 106b. There is no separation of forward scatter light and the backward scatter light when the axis traversing through mirrors 108 and 116 is perpendicular to beam paths of optical beams 106a and 106b, and mirrors 108 and 116 measure the same signal. One of mirrors 108 and 116 measures only forward scatter light and the other mirror measures only backward scatter light when the angle between an axis traversing through mirrors 108 and 116 and beam paths of optical beams 106a and 106b is about 0 degrees. Amount of forward scatter light and backward scatter light measured by mirrors 108 and 116 changes by a predetermined weighting factor when the angle between an axis traversing through mirrors 108 and 116 and beam paths of optical beams 106a and 106b changes from about 0 degrees to about 90 degrees. In one embodiment of the present invention, the amount of forward scattered light measured by one of mirror 108 and 116 and the amount of backward scattered light measured by the other mirror increases by a weighting factor when the angle between an axis traversing through mirrors 108 and 116 and beam paths of optical beams 106a and 106b decreases from about 0 degrees to about 90 degrees. In some embodiments of the present invention, the angle between an axis traversing through mirrors 108 and 116 and beam paths of optical beams 106a and 106b is about 75 degrees. FIG. 7 illustrates a comparison of calculated particle scatter signals for various angles between an axis traversing perpendicular to mirror 108 and beam paths of optical beams 106a and 106b. FIG. 7 shows that optical characterization apparatus 100 records a signal that is ambiguous near 1 μm when mirror 108 is perpendicular to the beam paths of optical beams 106a and 106b, and records an ambiguous signal for more forward-scattered light but a nearly monotonic response for the more backward-scattered light when mirror 108 is rotated to various other angles.

Figure 9A:
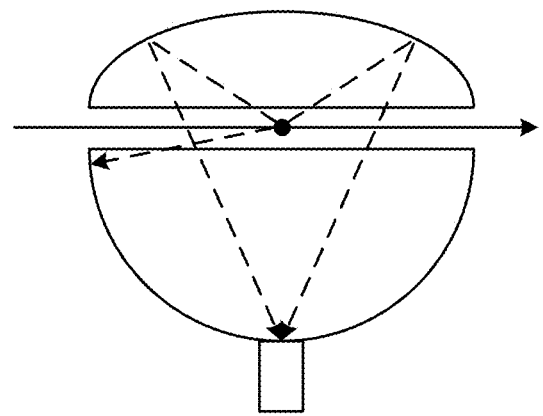
FIG. 9A illustrates an exemplary arrangement of light collection optics using an ellipsoidal mirror and a hemispherical mirror having an open slot between the mirrors in an optical particle characterization apparatus in accordance with an alternate embodiment of the present invention.
Figure 9B:
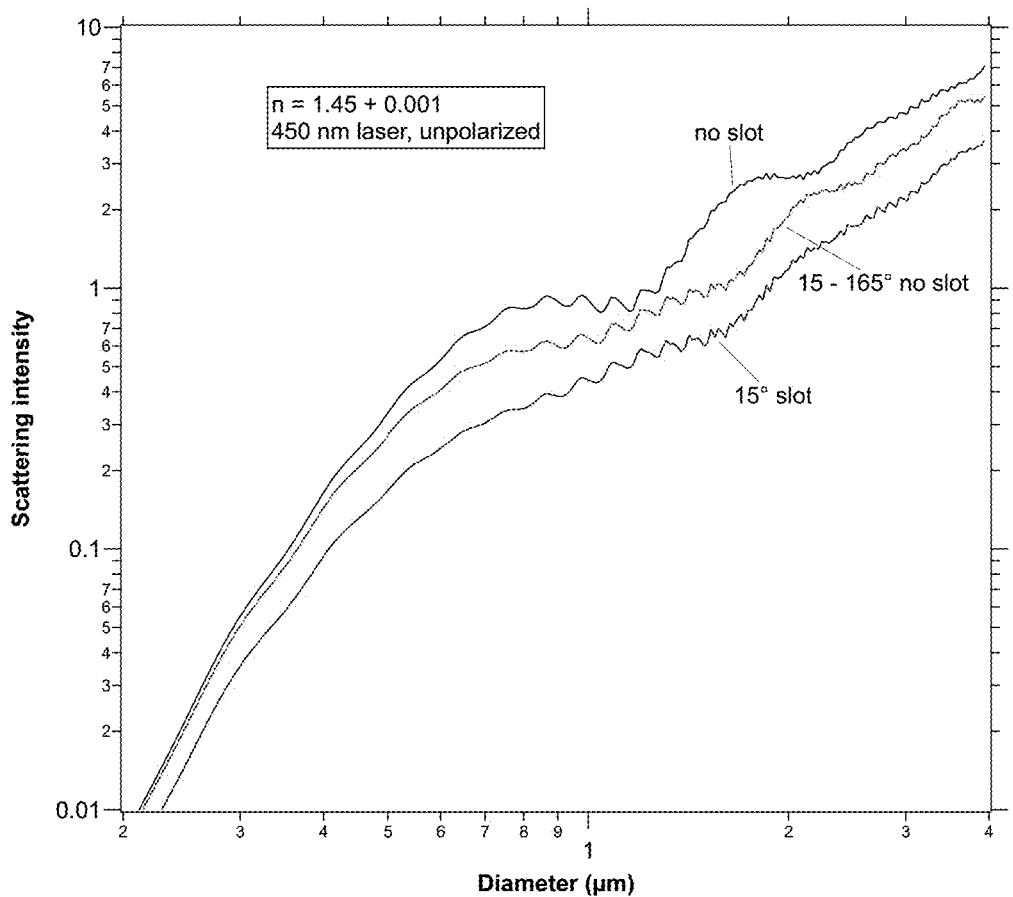
FIG. 9B illustrates a plot comparing particle size ambiguity and slot size between the mirrors in an optical particle characterization apparatus in accordance with an embodiment of the present invention.

In an alternate embodiment of the present invention, particle size ambiguity observed for particles with diameters near 1 μm is resolved by positioning mirrors 108 and 116 to face each other and provide an open slot between the mirrors. FIG. 9A illustrates an exemplary arrangement of mirrors 108 and 116 using an ellipsoidal mirror and a hemispherical mirror to provide an open slot between the mirrors. FIG. 9B illustrates a plot comparing particle size ambiguity observed for particles with diameters near 1 μm when there is no slot between the mirrors and when there is a 15-degree slot between the mirrors. Other combinations of angles and slots are also possible.

Photodetector 112 is positioned to collect optical beam 108a scattered by a particle and reflected by mirror 108, as shown in FIG. 1 and FIG. 2, and photodetector 118 is positioned to collect optical beam 116a scattered by a particle and reflected by mirror 116, as further shown in FIG. 3 and FIG. 4. Photodetectors 112 and 118 transform the powers of optical beams 108a and 116a into electric signals, which are recorded by processor 114. In some embodiments of the present invention, measurements of reflected optical beams 108a and 116a by photodetectors 112 and 118 is synchronized with the operation of the light source 102. Processor 114 is positioned in communication with photodetectors 112 and 118 to collect the electrical signals from photodetectors 112 and 118. In one embodiment of the present invention, processor 114 comprises a data acquisition system built around a single board computer.

Figure 5:
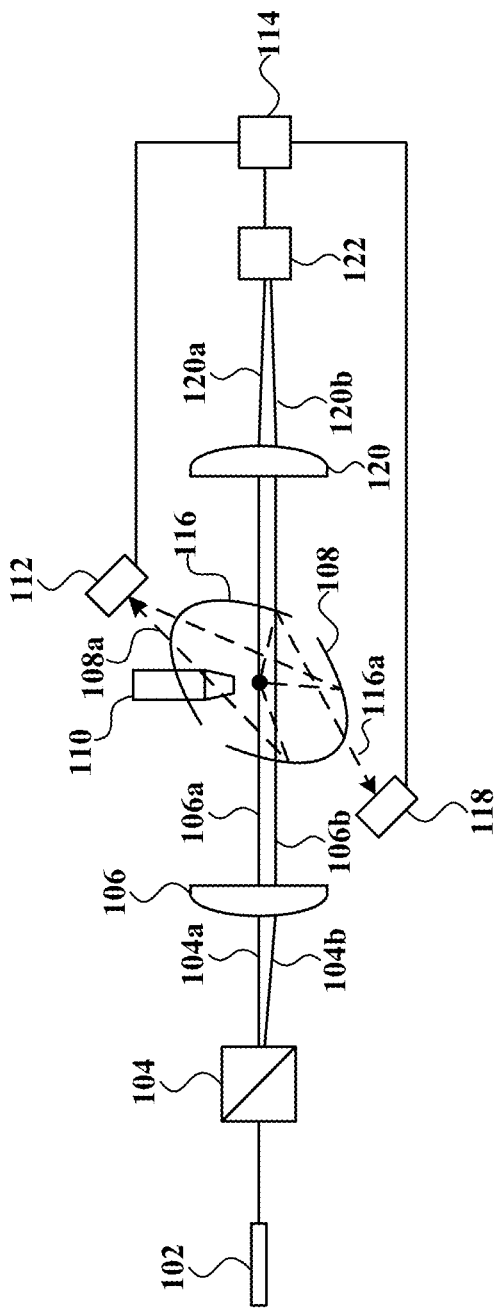
FIG. 5 illustrates an optical particle characterization apparatus in accordance with another embodiment of the present invention.
Figure 6:
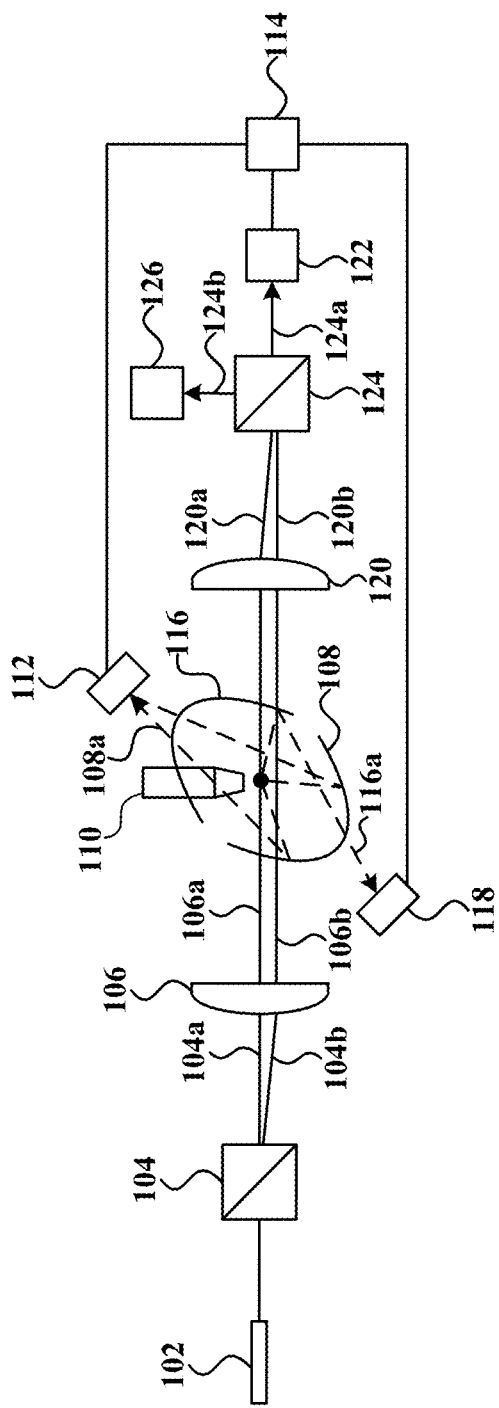
FIG. 6 illustrates an optical particle characterization apparatus in accordance with another alternate embodiment of the present invention.

Some embodiments of the present invention further include a lens 120 positioned to collect portions of optical beams 106a and 106b that are not scattered by particles in the gas sample and transmitted through the interrogation region, and focus the collected optical beams 106a and 106b to a photodetector 122 as optical beams 120a and 120b, as further shown in FIG. 5 and FIG. 6. Photodetector 122 transforms the power of optical beams 120a and 120b into electric signals, which are recorded by a processor 114. In some embodiments of the present invention, measurement of transmitted optical beams 120a and 120b by photodetector 122 is synchronized with the operation of the light source 102. Processor 114 is positioned in communication with photodetector 122 to collect the electrical signals from photodetector 122.

In an alternate embodiment of the present invention, as shown in FIG. 6, a second beam splitter 124 is positioned at the focal point of lens 120120 to receive optical beams 120120a and 120120b from lens 120120 and split the focused optical beams 120120a and 120120b into two orthogonally polarized beams 124a and 124b that are deflected at different angles and separated by a distance. Exemplary polarizing beam splitters that can be used in embodiments of the present invention include Wollaston prism, a Rochon prism, Senarmont prism, Sanderson prism, and the like. In a preferred embodiment of the present invention, polarizing beam splitter 124 is a Wollaston prism capable of splitting optical beams 120120a and 120120b into orthogonally polarized beams 124a and 124b. In an exemplary embodiment of the present invention, polarizing beam splitter 124 is a Wollaston prism capable of splitting optical beams 120120a and 120120b into orthogonally polarized beams 124a and 124b that are deflected at an angle of about 90 degrees.

Photodetectors 122 and 126 are aligned to detect each of the split polarized beams 124a and 124b that are deflected by beam splitter 124. Photodetector 122 is positioned to detect optical beam 124a deflected by beam splitter 124 and photodetector 126 is positioned to detect optical beam 124b deflected by beam splitter 124, as further shown in FIG. 6. Photodetectors 122 and 126 transforms the power of optical beams 124a and 124b into electric signals, which are recorded by a processor 114. In some embodiments of the present invention, measurements of optical beams 124a and 124b by photodetectors 122 and 126 are synchronized with the operation of the light source 102. Processor 114 is positioned in communication with photodetectors 122 and 126 to collect the electrical signals from photodetectors 122 and 126.

During typical operation of optical particle characterization apparatus 100, light source 102 emits a continuous-wave laser for generating primary optical beam along path 102a. The continuous-wave laser generated by laser source 102 may be periodically turned on and off, or modulated, for pulsed operation. The wavelength of optical beam 102a is chosen to minimize interference in optical signal due to absorption from common atmospheric constituents. In one embodiment of the present invention, light source 102 emits a continuous-wave diode laser centered at 450 nm. The wavelength of 450 nm is chosen to minimize interference in aerosol extinction signal due to absorption from common atmospheric constituents. Optical beam 102a enters beam splitter 104 and is split by beam splitter 104 into two orthogonally polarized optical beams 104a and 104b that are deflected at different angles and separated by a distance, wherein optical beam 104a is s-polarized and optical beam 104b is p-polarized. Orthogonally polarized optical beams 104a and 104b are incident on lens 106 and focused by lens 106 to an interrogation region, located at the primary focus of mirror 108, as collimated optical beams 106a and 106b having a predetermined distance between them.

During sampling mode, sample gas including particles is introduced into the interrogation region via inlet 110 such that a single particle is directed at a time through the interrogation region. Optical beams 106a and 106b are scattered by the particle in the interrogation region. A portion of the scattered optical beams 106a and 106b is reflected by mirror 108 as optical beam 108a to photodetector 112. Another portion of optical beams 106a and 106b scattered by the particle in the interrogation region is reflected by mirror 116 as optical beam 116a to photodetector 122, as shown in FIG. 3. Photodetectors 112 and 118 detect optical beams 108a and 116a and transform the powers of optical beams 108a and 116a into electric signals. Processor 114 determines the intensities of optical beams 108a and 116a from the electrical signals and records two peaks of scattered light separated from each other resulting from different polarizations of optical beams 106a and 106b. Processor 114 further determines velocity of the particle from the time separation between the two peaks, and determines optical diameter of the particle from the peak heights. In one embodiment, processor 114 determines an aerodynamic diameter of the particle from the velocity of the particle and converts peak height into an optical diameter using calibrations. Peak heights from the perpendicular polarizations of optical beams 106a and 106b will indicate whether the particle is spherical. Processor 114 compares the peak heights from the two beams having different polarizations to determine sphericity of the particle. Dissimilar peak heights from the two polarizations generally indicate non-spherical particles. The scattering of optical beams 106a and 106b are consistent (not necessarily identical) when the particles are spherical, and the scattering of optical beams 106a and 106b by non-spherical particles will depend on the orientation of the particles as it scatters the polarized optical beams 106a and 106b.

Portions of optical beams 106a and 106b that are not scattered are transmitted through the interrogation region to lens 120120, as further shown in FIG. 5. Lens 120120 focuses optical beams 106a and 106b to photodetector 122 as optical beams 120120a and 120120b. Each of transmitted optical beams 120120a and 120120b can be used as a reference for the other, and to cancel power fluctuations in optical beams 120120a-b and background noise. In one embodiment of the present invention, photodetector 122 is an interferometric detector. In some embodiments of the present invention, optical beams 120120a and 120120b are separated into optical beams 124a and 124b using beam splitter 124, as shown in FIG. 6. In embodiments of the present invention as shown in FIG. 6, photodetectors 122 and 126 detects optical beams 124a and 124b deflected by beam splitter 124, and processor 114 records the difference between the transmitted light of the two beams.

Figure 8:
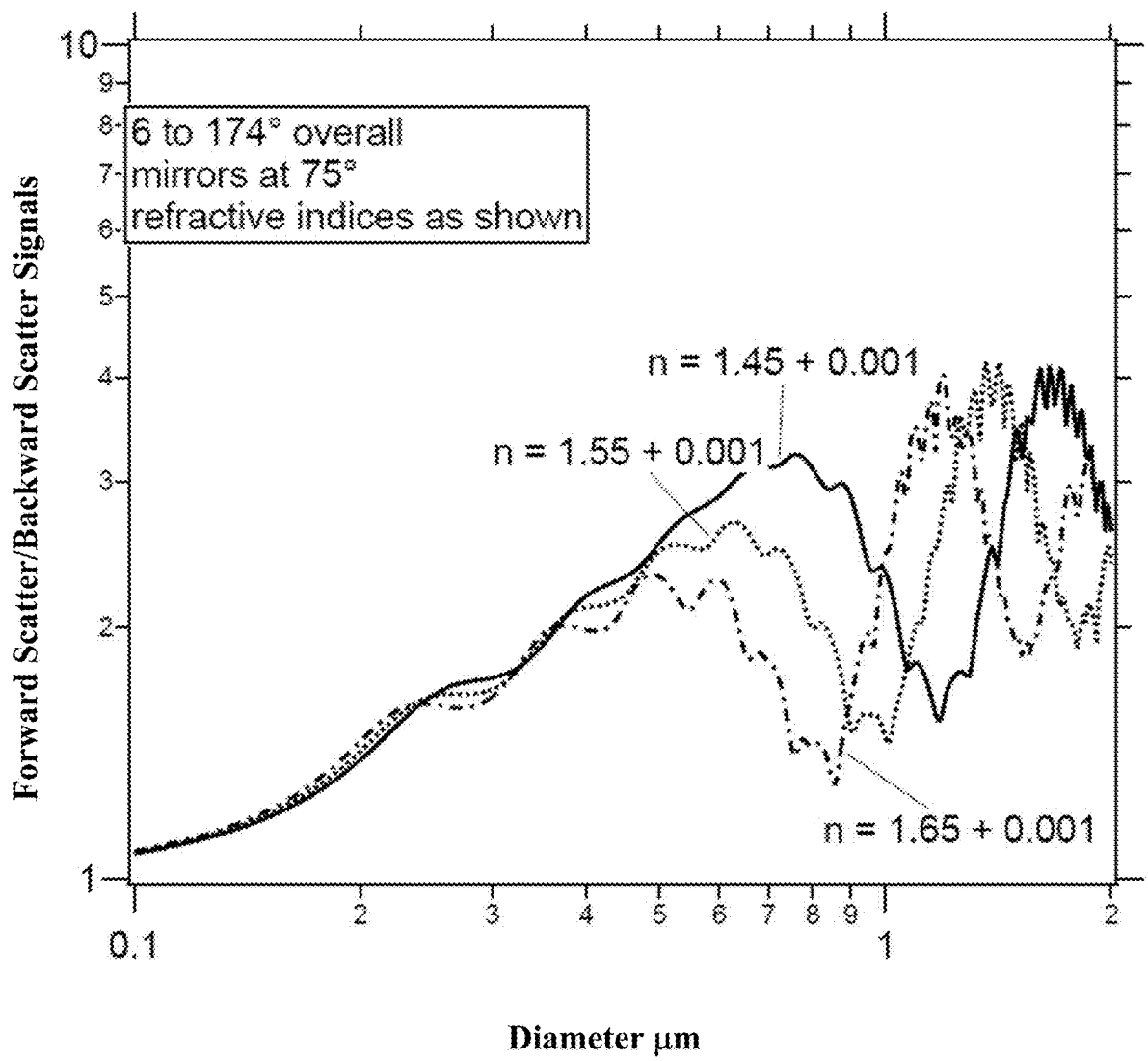
FIG. 8 illustrates a plot comparing signals obtained using an optical particle characterization apparatus in accordance with an alternate embodiment of the present invention.

Referring back to FIG. 5, photodetector 122 detects the transmitted optical beams 120120a and 120120b and processor 114 determines loss of light in optical beams 106a and 106b from the detected signals and calculates extinction using the detected signal of each of optical beams 120a and 120b as a reference beam for the other. Processor 114 further determines an absorption for each of the particles from the calculated extinction and scattering signals detected from optical beams 108a and 116a. Processor 114 determines albedo from a ratio of the scattering signals detected from optical beams 108a and 116a and the extinction. Size distributions of particles in the gas sample can be obtained from Mei scattering pattern calculations, which provides the relative intensity of scattered light as a function of particle size, angle of observation, and wavelength and polarization of the incident beam. Processor 114 also determines refractive index from a ratio of forward scatter to backward scatter of optical beams 106a and 106b by particles. In one embodiment of the present invention, refractive index can be determined from a ratio of forward scatter to backward scatter of optical beams 106a and 106b by particles having diameter in the range from about 0.4 μm to about 0.8 μm. FIG. 8 shows a plot of a ratio of forward scatter to backward scatter signals and particle diameter obtained using optical characterization apparatus 100.

Embodiments in accordance with the present invention combines optical elements and aerodynamic particle sizer in an arrangement using ellipsoidal beam foci that is suited for measurements of light scattered by particles. Optical particle characterization apparatus in accordance with embodiments of the present invention use split polarization in a combined optical and aerodynamic particle sizer to determine particle shape. A less ambiguous size response and, for some particle sizes, refractive index of the particles can be obtained by rotating the position of the ellipsoidal (or other) mirrors. Embodiments in accordance with the present invention also use the transmitted light for a measure of light absorption by the particles in the combined sizer. Advantages of embodiments of the present invention include utilizing the laser's low polarization noise to make each of the split beams a reference beam for the other; measuring absorption using an interferometric detector or a pair of photodiodes that record the difference between the transmitted light of the two beams; and applying a pair of photodiodes in a difference electronic circuit to aerosol particle counters. Further, the split beams used in embodiments of the present invention are close to each other, which not only allows the use of fewer detectors but also reduces coincidence errors (more than one particle in the active sensing region at the same time).

Optical particle characterization apparatus in accordance with embodiments of the present invention can be adapted to a variety of configurations suitable for selective particle characterization in a gas sample. Construction of apparatus, as described herein, provides flexibility to vary the shape of optical particle characterization apparatus to fit specific spaces. It is thought that optical particle characterization apparatus of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. An apparatus for measuring particles in a sample gas, said apparatus comprising:
   a light source for emitting a first optical beam;
   a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle;

a first lens configured to collect the first component and the second component polarized optical beams and focus each of the first component and the second component polarized optical beams to an interrogation region, wherein the first optical beam splitter is positioned at the first lens focal point;

an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream flowing through the interrogation region scatters the first component and the second component polarized optical beams;

a first mirror positioned adjacent to paths traversed by the first component and the second component polarized optical beams to reflect a first scattered optical beam scattered from the first component polarized optical beam and a second scattered optical beam scattered from the second component polarized optical beam, wherein an axis perpendicular to a plane of the first mirror intersects the paths traversed by the first component and the second component polarized optical beams at a non-perpendicular second angle, wherein the first mirror focal point is positioned at the interrogation region;

a first photodetector positioned to measure the first and the second scattered optical beams from the first mirror and produce corresponding first and second signals; and a processor, responsive to the first and the second signals from the first photodetector, for calculating intensity and time separation of the first and the second scattered optical beams, wherein the processor, responsive to said intensity and time separation of the first and the second scattered optical beams, determines velocity and aerodynamic diameter of the particles in the sample gas.

2. The apparatus of claim 1, further comprising:
a second mirror positioned facing the first mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second mirror aligns with the axis perpendicular to the plane of the first mirror, wherein the second mirror focal point is positioned at the interrogation region; and a second photodetector positioned to measure the third and the fourth scattered optical beams from the second mirror and produce corresponding third and fourth signals, wherein the processor, responsive to the third and the fourth signals from the second photodetector, calculates intensity and time separation of the third and the fourth scattered optical beams, wherein the processor, responsive to said intensity and time separation of the third and the fourth scattered optical beams, determines velocity and aerodynamic diameter of the particles in the sample gas.

3. The apparatus of claim 1, further comprising:
a second lens configured to collect the first component and the second component polarized optical beams transmitted through the interrogation region and focus each of the collected the first component and the second component polarized optical beams to the second lens focal point; and a second photodetector positioned at the second lens focal point to measure the each of the collected the first component and the second component polarized optical beams and produce corresponding third and fourth signals, wherein the processor, responsive to the third and the fourth signals from the second photodetector, determines extinction of the particles in the sample gas.

4. The apparatus of claim 2, further comprising:
a second lens configured to collect the first component and the second component polarized optical beams transmitted through the interrogation region and focus each of the collected the first component and the second component polarized optical beams to the second lens focal point;

a second optical beam splitter positioned at the second lens focal point and configured to split the focused the first and the second polarized optical beams into a third component polarized optical beam and a fourth component polarized optical beam, wherein the splitting the focused the first component and the second component polarized optical beams into the third component and the fourth component polarized optical beams comprises deflecting the third component polarized optical beam from the fourth component polarized optical beam at a third angle;

a third photodetector positioned to measure the third component polarized optical beam and produce a corresponding fifth signal; and a fourth photodetector positioned to measure the fourth component polarized optical beam and produce a corresponding sixth signal, wherein the processor, responsive to the fifth and the sixth signals, determines extinction of the particles in the sample gas.

5. The apparatus of claim 1, wherein the axis perpendicular to the plane of the first mirror intersects the paths traversed by the first component and the second component polarized optical beams at the second angle of about 75 degrees.

6. The apparatus of claim 2, wherein the axis perpendicular to the plane of the first and the second mirrors intersects the paths traversed by the first component and the second component polarized optical beams at the second angle of about 75 degrees.

7. The apparatus of claim 1, wherein the first optical beam splitter is Wollaston prism.

8. The apparatus of claim 1, wherein each of the first and the second mirrors is an ellipsoidal mirror.

9. The apparatus of claim 1, wherein the light source is a 450 nm diode laser.

10. The apparatus of claim 3, wherein each of the first and the second lenses is a 40 mm cylindrical lens.

11. An apparatus for measuring particles in a sample gas, said apparatus comprising:
a light source for emitting a first optical beam;

a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle;

a first cylindrical lens configured to collect the first component and the second component polarized optical beams and focus each of the first component and the second component polarized optical beams to an interrogation region, wherein the first optical beam splitter is positioned at the first cylindrical lens focal point;

an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream flowing through the interrogation region scatters the first component and the second component polarized optical beams;

a first mirror positioned adjacent to paths traversed by the first component and the second component polarized optical beams to reflect a first scattered optical beam scattered from the first component polarized optical beam and a second scattered optical beam scattered from the second component polarized optical beam, wherein an axis perpendicular to a plane of the first mirror intersects the paths traversed by the first component and the second component polarized optical beams at a non-perpendicular second angle, wherein the first mirror focal point is positioned at the interrogation region;

a first photodetector positioned to measure the first and the second scattered optical beams from the first mirror and produce corresponding first and second signals;

a second mirror positioned facing the first mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second mirror aligns with the axis perpendicular to the plane of the first mirror, wherein the second mirror focal point is positioned at the interrogation region; and a second photodetector positioned to measure the third and the fourth scattered optical beams from the second mirror and produce corresponding third and fourth signals;

a processor, responsive to the first, the second, the third and the fourth signals, for calculating intensity and time separation of the first, the second, the third and the fourth scattered optical beams, wherein the processor, responsive to said intensity and time separation, determines velocity and aerodynamic diameter of the particles in the sample gas.

12. The apparatus of claim 11, further comprising:
a second cylindrical lens configured to collect the first component and the second component polarized optical beams transmitted through the interrogation region and focus each of the collected the first component and the second component polarized optical beams to the second cylindrical lens focal point;

a third photodetector positioned at the second cylindrical lens focal point to measure the each of the collected the first component and the second component polarized optical beams and produce corresponding fifth and sixth signals;

wherein the processor, responsive to the fifth and sixth signals from the third photodetector, determines extinction of the particles in said sample gas.

13. The apparatus of claim 11, wherein the axis perpendicular to the planes of the first and the second mirrors intersect the paths traversed by the first component and the second component polarized optical beams at the second angle of about 75 degrees.

14. The apparatus of claim 11, wherein the first optical beam splitter is Wollaston prism.

15. The apparatus of claim 11, wherein each of the first and the second mirrors is an ellipsoidal mirror.

16. The apparatus of claim 12, wherein each of the first and the second cylindrical lenses is a 40 mm cylindrical lens.

17. An apparatus for measuring particles in a sample gas, said apparatus comprising:
a light source for emitting a first optical beam;
a first optical beam splitter configured to split the first optical beam into a first component polarized optical beam and a second component polarized optical beam, wherein the splitting the first polarized optical beam into the first component and the second component polarized optical beams comprises deflecting the first component polarized optical beam from the second component polarized optical beam at a first angle;

a first cylindrical lens configured to collect the first component and the second component polarized optical beams and focus each of the first component and the second component polarized optical beams to an interrogation region, wherein the first optical beam splitter is positioned at the first cylindrical lens focal point;

an inlet positioned adjacent to the interrogation region to deliver the sample gas comprising the particles to the interrogation region, wherein the inlet comprises a channel configured to restrict flow of the sample gas to a single particle gas stream through the interrogation region, wherein the single particle gas stream through the interrogation region scatters the first component and the second component polarized optical beams;

a first ellipsoidal mirror positioned adjacent to paths traversed by the first component and the second component polarized optical beams to reflect a first scattered optical beam scattered from the first component polarized optical beam and a second scattered optical beam from the second component polarized optical beam, wherein an axis perpendicular to a plane of the first ellipsoidal mirror intersects the paths traversed by the first component and the second component polarized optical beams at a non-perpendicular second angle, wherein the first ellipsoidal mirror focal point is positioned at the interrogation region;

a first photodetector positioned to measure the first and the second scattered optical beams from the first ellipsoidal mirror and produce corresponding first and second signals;

a second ellipsoidal mirror positioned facing the first ellipsoidal mirror and adjacent to paths traversed by the first component and the second component polarized optical beams to reflect a third scattered optical beam scattered from the first component polarized optical beam and a fourth scattered optical beam scattered from the second component polarized optical beam, wherein an axis perpendicular to a plane of the second ellipsoidal mirror aligns with the axis perpendicular to the plane of the first ellipsoidal mirror, wherein the second ellipsoidal mirror focal point is positioned at the interrogation region;

a second photodetector positioned to measure the third and the fourth scattered optical beams from the second ellipsoidal mirror and produce corresponding third and fourth signals;

a second cylindrical lens configured to collect the first component and the second component polarized optical beams transmitted through the interrogation region and focus each of the collected the first component and the second component polarized optical beams to the second cylindrical lens focal point;

a second optical beam splitter positioned at the second cylindrical lens focal point and configured to split the focused the first and the second polarized optical beams into a third component polarized optical beam and a fourth component polarized optical beam, wherein the splitting the focused the first component and the second component polarized optical beams into the third component and the fourth component polarized optical beams comprises deflecting the third component polarized optical beam from the fourth component polarized optical beam at a third angle;

a third photodetector positioned to measure the third component polarized optical beam and produce a corresponding third signal;

a fourth photodetector positioned to measure the fourth component polarized optical beam and produce a corresponding fourth signal; and a processor, responsive to the first signal from the first photodetector and the second signal from the second photodetector, determines velocity and aerodynamic diameter of the particles in said sample gas, wherein the processor, responsive to the third and fourth signals from the third and the fourth photodetectors, determines extinction of the particles in said sample gas.

18. The apparatus of claim 17, wherein each of the first and the second cylindrical lenses is a 40 mm cylindrical lens.

19. The apparatus of claim 17, wherein the axis perpendicular to the planes of the first and the second ellipsoidal mirrors intersect the paths traversed by the first component and the second component polarized optical beams at the second angle of about 75 degrees.

20. The apparatus of claim 17, wherein each of the first and the second optical beam splitters is a Wollaston prism.

* * * * *